May 6, 1958     F. K. KNOHL     2,833,326
SCREW OR NUT WITH LOCKING PROJECTIONS
Filed April 19, 1956
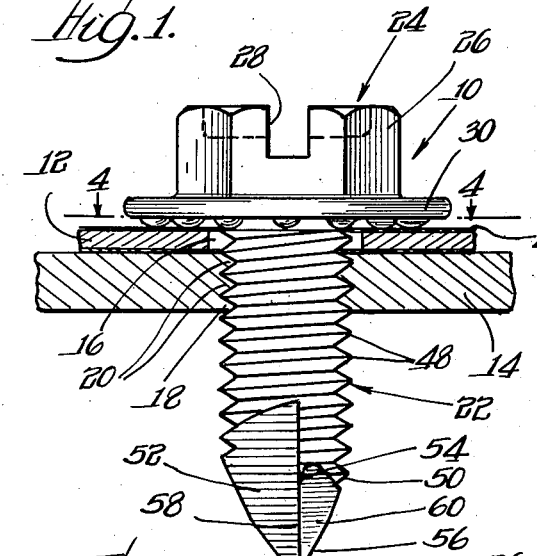
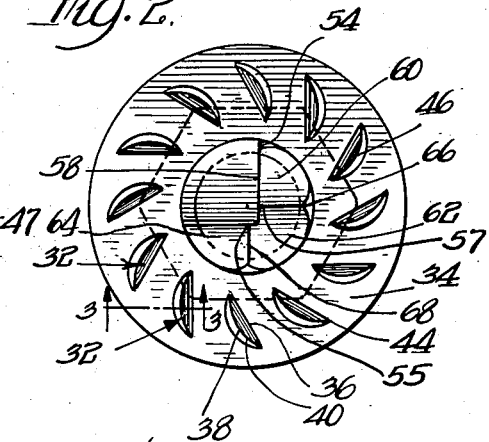
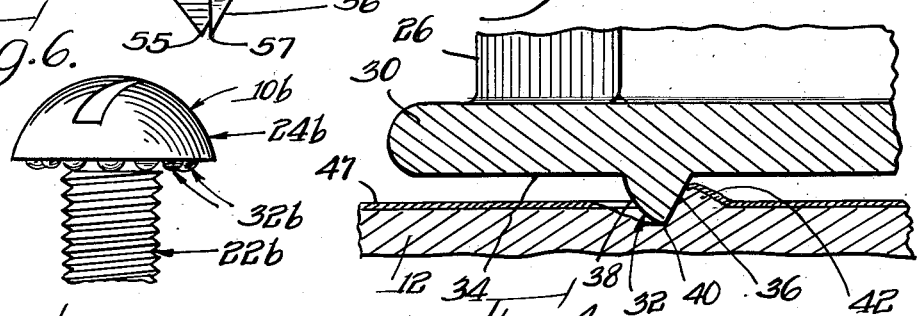
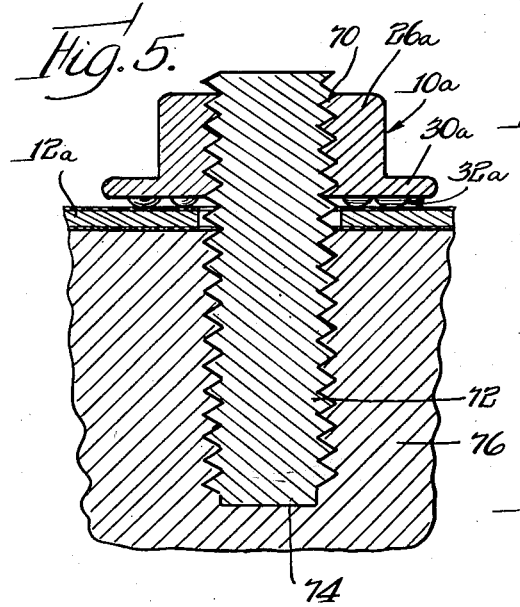
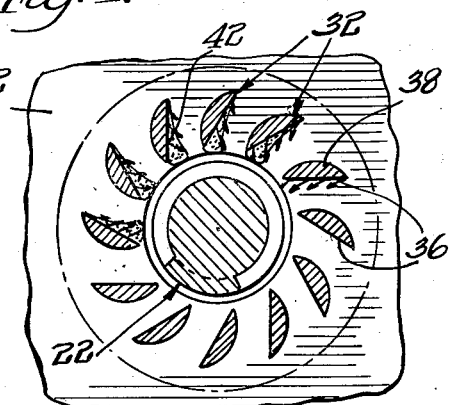
INVENTOR.
Friedrich Karl Knohl
BY:
Olson & Trexler
attys.

United States Patent Office 2,833,326
Patented May 6, 1958

2,833,326

SCREW OR NUT WITH LOCKING PROJECTIONS

Friedrich Karl Knohl, Chicago, Ill., assignor to Illinois Tool Works, Chicago, Ill., a corporation of Illinois Application April 19, 1956, Serial No. 579,298

6 Claims. (Cl. 151—37)

The present invention relates to novel rotary fastener members, and more particularly to novel fastener members such as screws or nuts.

In the manufacture of various appliances such as stoves, washing machines and the like as well as various other structures, many sheet metal members are connected to each other or to frame members by screws extending through apertures in the members and having threads engaging at least one of the members. Past experience has shown that in many instances a workman will turn the screws too tight and as a result the margins or thread convolutions defining the apertures in the panel or workpiece are stripped. When this occurs the screw is no longer operable to retain the members together, and it has frequently been the practice to line such a stripped aperture with a grommet or the like so as to permit re-application of the screw. A somewhat similar problem is encountered when a nut member is applied too tightly to a stud threaded into an aperture in a light metal alloy casting with the result that the threads of the castings are stripped and the stud is pulled loose.

In addition to the above mentioned difficulty, assembly of a pair of panels or members is frequently complicated as a result of slight misalignment of the apertures therein which makes application of the screws relatively difficult. Furthermore, panels of various electrical appliances such as stoves, washing machines and the like should be electrically connected with a ground wire, and special steps frequently must be taken to accomplish this result since the panels are usually coated with ceramic material.

An important object of the present invention is to provide a novel rotary fastener such as a screw or a nut which is formed so as to substantially eliminate any possibility of stripping the screw or a stud cooperable with the nut from a workpiece during the application of the fastener in accordance with the usual procedures.

A more specific object of the present invention is to provide a novel rotary fastener such as a screw or a nut which is constructed so as to provide a relatively high and progressively increasing resistance to turning of the nut or the head of the screw relative to the workpiece during application of the fastener without unduly straining helical threads of the workpiece whereby a substantially greater torque than is usual must be applied to the screw head or nut before the threads will fail.

Still another object of the present invention is to provide a novel fastener member of the above described type which is formed so as to obtain a resilient locking action and thus improved resistance to unauthorized retrograde movement.

A more specific object of the present invention is to provide a novel fastener member of the above described type formed so as to insure good electrical contact with a workpiece even though the workpiece is coated with ceramic material or the like.

Still another more specific object of the present invention is to provide a thread cutting screw of the above described type which may be more easily applied to apertured panels or workpieces even though the apertures and the panels may be undersized or slightly out of alignment.

Other objects and advantages of the present invention will become apparent from the following description and the accompanying drawings wherein:

Fig. 1 is a partial sectional view showing a screw member incorporating the features of the present invention applied to a pair of apertured panels:

Fig. 2 is an entering end view of the screw member;

Fig. 3 is an enlarged fragmentary sectional view taken along line 3—3 in Fig. 2;

Fig. 4 is a fragmentary sectional view taken along line 4—4 in Fig. 1;

Fig. 5 is a sectional view showing a nut member incorporating the features of the present invention applied to a workpiece; and Fig. 6 is an elevational view showing a screw member embodying a slightly modified form of the present invention.

Referring now more specifically to the drawings, wherein like parts are designated by the same numerals throughout the various figures, a fastener member or screw 10 embodying one form of the present invention is shown in Figs. 1 through 4. While the screw member 10 may be used for various purposes, it is especially adapted for securing a cover plate or panel 12 to a sheet metal panel or frame member 14. The panel 12 is provided with an aperture 16 preferably having a diameter slightly larger than the outside diameter of the screw member, and the panel or frame member 14 is provided with an aperture 18 initially having a diameter less than the outside diameter of the screw member. The aperture 18 may be defined by preformed thread convolutions 20, but preferably the aperture 18 is initially provided with a smooth margin and the thread convolutions 20 are formed by the screw member during assembly of the parts.

The screw member 10 comprises a shank or stud portion 22 and a head portion 24. The head portion has a hexagonal section 26 and a transverse slot 28 so that the screw member may be tightened by means of either a wrench or screw driver. At its work clamping side the head portion has an integral radially extending flange or washer section 30 which projects substantially beyond the peripheral surface of the hexagonal or non-circular section 26.

In accordance with an important feature of the present invention means is provided for obtaining substantial and progressively increasing resistance to rotation of the head portion 24 relative to the work so as to reduce any possibility of unduly stressing and stripping the threads 20 of the workpiece 14. This means comprises a plurality of protuberances or nibs 32 spaced evenly around and projecting axially from the clamping face 34 of the head section 30. Each of the protuberances has a substantially straight flat leading side 36 which faces generally in the direction of rotation of the screw member and a curved trailing side 38. Each side 36 is inclined from the root of its protuberance rearwardly at a relatively large angle with respect to the clamping face 34, and each side 38 is inclined forwardly at a relatively small angle with respect to the clamping face. Each pair of sides 36 and 38 intersect each other to provide a curved cutting or digging edge 40. Thus, as the head portion is turned against the workpiece 12, the protuberances or nibs 32 dig into the surface of the workpiece and progressively scuff up abutments 42 on the surface of the workpiece which provide increasing resistance to turning of the head portion relatively to the workpiece. It should be noted that a large number of closely spaced protuberances or nibs 32 is provided and that preferably the nibs are spaced approximately every 30° around the clamping face 34, as shown. This assures the continuous formation of abutments and engagement of the protuberances with the abutments at points spaced entirely around the clamping face 34 even though the clamping face may be tilted slightly relative to the workpiece surface and even though portions of some of the abutments may break away from the workpiece. It should also be noted that the protuberances as a whole are inclined from their radial outer ends 44 rearwardly with respect to the forward direction of rotation of the screw member and at an angle to radial lines intersecting the protuberances. As a result, the material of the workpiece which is scuffed up into the abutments 42 is directed inwardly and trapped adjacent the shank of the screw as shown best in Fig. 4 to promote a continuous increase in the size of the protuberances and a continuous increase in the resistance to turning provided thereby during application of the screw member to the workpieces.

As shown best in Fig. 2 the protuberances 32 are located so that substantial portions thereof are located radially outwardly of the hexagonal section 26 of the head portion and terminate adjacent the periphery of the flange portion 30. Thus, when the head portion is tighten against the workpiece, the protuberances transmit forces to the flange section 30 which cause the flange section to flex upwardly. The inherent resiliency of the flange section provides a locking action tending to resist an unauthorized retrograde movement of the screw by yieldably drawing the screw threads against the threads of the workpiece. The desired flexing of the flange section 30 is promoted by locating the protuberances so that their mid or high points 46 are located radially outwardly of the solid hexagonal section of the head portion.

It will be appreciated that when the screw member is tighten against the workpiece 12, the protuberances will dig through any layer 47 of ceramic material or the like on the workpiece 12 and automatically establish a good electrical connection between the workpiece and the screw member so that the workpiece or panel 12 may be easily properly grounded. Upon retrograde turning of the screw member to loosen it from the workpiece, the protuberances 32 will spread and ride relatively easily over the previously formed abutment 42 as a result of the above mentioned curved formation and angularly positioning of the protuberance sides 38.

The shank or stud 22 of the screw member is provided with a plurality of helical thread convolutions 48. In the embodiment shown the convolutions 48 are right-hand threads and the protuberances 32 are disposed for digging into the surface of the workpiece when the screw member is tighten by turning it toward the right. A portion 50 of the thread convolutions adjacent an entering end of the screw shank are tapered or of diminishing height and are interrupted by an axially extending recess 52 so that a thread cutting edge 54 is provided at the junction between one wall of the recess and the thread convolutions 50. Thus, the screw member is adapted to form complementary threads in the workpiece 14 as will be understood. An entering end portion 56 of the screw shank or stud is pointed in the manner shown so as to facilitate starting of the screw into the aperture and workpiece 14 in the event that this aperture is slightly undersized or slightly out of alignment with the aperture and workpiece 12 or clogged with ceramic coating material applied to the workpiece after the aperture has been formed. An extension 58 of the cutting edge 54 axially traverses the pointed entering end portion 56 and serves to ream out the aperture in workpiece 14 in the event the aperture is clogged, undersized or misaligned so as further to facilitate application of the screw member. The cutting edge is offset from the axis of the shank so that a pair of tips 55 and 57 are provided which help to break through a ceramic material clogging the aperture. Preferably, the surface 60 of the pointed end portion behind the cutting edge 58 is flattened and relieved so as to provide clearance behind the cutting edge to promote a more effective cutting action. Furthermore, the entering end portion is preferably provided with additional flat sides 62 and 64 and straight edges 66 and 68 between the sides which aid in the reaming operation.

In Fig. 5 there is shown a rotary fastener member embodying a modified form of the present invention, which fastener is in a form of a nut 10a having features similar to the head portion of the above described screw member as indicated by the application of identical reference numerals with the suffix a added to corresponding elements. The nut member is provided with a central threaded aperture 70 and is adapted to be applied to a stud 72 turned into a blind opening 74 and a casting 76 or similar workpiece. As will be understood, when the workpiece or casting 76 is formed from light metals or alloys such as aluminum, magnesium or the like, the threads of the workpiece engaging the stud may be relatively easily stripped if the nut member is applied too tightly. In such instances, the nut member 10a having the flange portion 30a and protuberances 32a which are identical to the corresponding elements described above functions to restrain stripping of the workpiece threads.

Fig. 6 shows a screw member embodying another modified form of the present invention which is similar to the above described screw member as indicated by the application of identical reference numerals with the suffix b added to corresponding elements. This embodiment differs in that the shape of the head portion has been modified and the resilient radially extending flange has been eliminated. The screw member 10b may be utilized for many purposes where the resilient locking action of the flange is not required. It will also be appreciated that a nut member, not shown, without the resilient flange could be provided with the protuberances and still have many of the advantages of the nut member 10a.

While the preferred embodiments of the present invention have been shown and described herein it is obvious that many structural details may be changed without departing from the spirit and scope of the appended claims.

The invention is claimed as follows:

1. A torque absorbing rotary threaded fastener member adapted to be tightened by rotation in one direction, and comprising a substantially radially extending clamping face, and a plurality of relatively small integral projections in each quadrant of the clamping face and spaced from one another by a substantially planar uninterrupted portion of the clamping face and projecting axially therefrom for engaging a workpiece, each said projection including a leading front face angularly disposed with respect to the plane of the clamping face and not more than a relatively small acute angle with the vertical and terminating in a bottom scraping edge facing in the direction of tightening and a trailing rear side inclining away from the direction of tightening relatively abruptly upwardly from said scraping edge to the clamping face for providing with the leading front side a relatively narrow projection with an axially facing narrow bottom edge to facilitate axial digging and embedment of each projection into the workpiece under the vertical component of force resulting from tightening rotation of the fastener member relative to the workpiece, the outer end of each projection leading the inner end thereof in the direction of tightening rotation, each projection extending over substantially at least one half the radial extent of the clamping face and the scraping edge of each of said plurality of projections operating to scuff up abutments of increasing mass during tightening of the fastener member for providing a cumulative increasing resistance to rotation of the fastener member in tightening direction whereby to resist stripping of the threads on the fastener member, the horizontal extent of each uninterrupted portion of the clamping face between adjacent projections being such that the previously scuffed up abutments in advance of a projection will not interlock with the trailing edge of the adjacent preceding projection in the direction of tightening rotation, whereby to facilitate intentional retrograde rotation of the fastener member in loosening direction.

2. A torque absorbing rotary threaded fastener member as claimed in claim 1, wherein the narrow bottom edge of each projection is convexly curved.

3. A torque absorbing rotary threaded fastener member as claimed in claim 1, wherein the trailing rear side of each projection is convexly curved in the direction of loosening rotation to facilitate spreading of the scuffed up abutments during intentional retrograde rotation of the fastener member.

4. A torque absorbing rotary threaded fastener member as claimed in claim 1, wherein the said projections are spaced at least approximately every 30° around the clamping face.

5. A torque absorbing rotary threaded fastener member as claimed in claim 1, wherein there is provided an outward annular flange around the fastener member and forming a substantially planar radial extension of the clamping face and with the projections extending over a substantial radial extent thereof.

6. A torque absorbing rotary threaded fastener member as claimed in claim 1, wherein the leading front face of each projection is substantially straight and lying substantially on a tangent to the threaded surface of the fastener member.

References Cited in the file of this patent

UNITED STATES PATENTS

| | | |
|---|---|---|
| 1,833,462 | Hagist | Nov. 24, 1931 |
| 2,037,586 | Olson | Apr. 14, 1936 |
| 2,112,494 | Olson | Mar. 29, 1938 |
| 2,147,209 | Olson | Feb. 14, 1939 |
| 2,147,211 | Olson | Feb. 14, 1939 |
| 2,253,241 | MacDonald | Aug. 19, 1941 |
| 2,479,730 | Dewar | Aug. 23, 1949 |
| 2,654,284 | Schevenell | Oct. 6, 1953 |
| 2,741,289 | Grow | Apr. 10, 1956 |

FOREIGN PATENTS

| | | |
|---|---|---|
| 621,686 | France | Feb. 12, 1927 |